United States Patent
McGrath et al.

[11] 3,715,576
[45] Feb. 6, 1973

[54] SYNCHRONIZED ILLUMINATION FOR OPERATIONS ON LIGHT SENSITIVE ARTICLES

[75] Inventors: John W. McGrath; Dennis E. Repsher, both of Allentown, Pa.

[73] Assignee: Western Electric Company, Incorporated, New York, N.Y.

[22] Filed: March 19, 1971

[21] Appl. No.: 126,217

[52] U.S. Cl. .............................. 240/2 R, 240/2 MA
[51] Int. Cl. ........................................... F21v 23/00
[58] Field of Search ........... 240/2 R, 2 MA; 350/81; 356/23; 324/76, 158 T, 158 F; 73/432

[56] References Cited

UNITED STATES PATENTS 2,521,141  9/1950  Allen ...................................356/23

Primary Examiner—Louis J. Capozi
Assistant Examiner—Denis Corr
Attorney—W. M Kain, R. P. Miller and R. Y. Peters

[57] ABSTRACT

A pulsable light source is synchronized with a test cycle during probe-testing of semiconductor devices. A high level of illumination is provided by energizing the light source to thereby assist an operator in viewing the probes and devices through a microscope between tests. During a test the light source is deenergized to eliminate the adverse effects of light on test results.

A typical test requires 10–20 milliseconds. Thus, the pulsable light source flashes at a frequency of approximately 50–100 flashes per second, appearing substantially continuous to the operator. Typically, the effects of light on semiconductor devices disappear within a few microseconds after removal of the light. Thus, through most of the time a device is being tested it is in darkness, while to the operator's eye the device appears to be illuminated.

10 Claims, 8 Drawing Figures

INVENTORS
J.W. McGRATH
D.E. REPSHER
BY *[signature]*
ATTORNEY

SYNCHRONIZED ILLUMINATION FOR OPERATIONS ON LIGHT SENSITIVE ARTICLES

BACKGROUND OF THE INVENTION

1. Field of the Invention

The invention relates to a unique system of illuminating semiconductor workpieces being inspected on a probe-tester wherein a light source is synchronized with a test cycle.

2. Description of the Prior Art

Testing of semiconductor devices, such as beam-lead integrated circuits or the like, is usually performed on an automatic probe testing machine. The devices are usually placed on the machine in a carefully structured array. The array is oriented to a set of predetermined X and Y axes within the prober by an operator. After such orientation, the prober begins to systematically progress through the array contacting each device, performing a series of tests on the device and then progressing onto the next device under the control of a computer program.

The initial alignment of the array with the predetermined X and Y axes is done by an operator who looks through a microscope. It would seem that once alignment was made through a microscope there would be no need for an operator until testing of the entire array was complete. Such is not the case, however.

Although great care is taken to maintain the array so that all of the devices are on parallel lines and accurately spaced from one another, there are times when the spacing and alignment is not perfect. Additionally, the initial alignment of the array with respect to the X and Y axes may not be perfect. Each of these conditions will result in the prober failing to contact one of the devices properly after a number of devices are tested. Therefore, it is necessary for an operator to periodically watch the functioning of the prober as it progresses around the array of devices. If the operator detects that the probe tips are not contacting each device properly, an adjustment must be made to compensate for this.

The beam leads of integrated circuits are extremely delicate objects and probes must therefore be very accurately adjusted so that the points of the probes do not damage the beam leads when contact is made. An operator must continuously be alert for improperly adjusted probe pressure that would damage the beam leads when integrated circuits are being tested.

All of these conditions require that an operator watch the operation of a probe through a microscope and, of course, in order to an operator to see the devices and the probe contact therewith, it is necessary for the devices to be illuminated. This illumination results in another problem. Semiconductor devices are inherently sensitive to light. High intensity illumination will distort the normal operating characteristics of of the semiconductor devices.

Thus, a dilemma develops. On one hand, an operator seeks to have bright illumination so that accurate probe operations can be achieved, but on the other hand, the high intensity illumination often brings about a distortion of the test results that are being obtained with the testing machine. The resolution of this dilemma has heretofore been accomplished by a compromise in which the intensity of the illumination has been reduced to a point where test results are not disturbed beyond a tolerable level. Such a compromise, however, becomes very undesirable when highly light-sensitive devices are being tested because an operator can not accurately control the operation of the prober because of poor visibility.

SUMMARY OF THE INVENTION

It is, therefore, an object of this invention to provide a system by which an operator of a probe-tester can be provided with a bright source of illumination while, at the same time, the test results are not being distorted by the bright illumination. This object is achieved by synchronizing a pulsable illumination source with a test cycle having a duration of about 10 to 20 milliseconds so that, while the device is undergoing tests, the illumination source is turned off and while the device is not being tested the illumination source is turned on. Thus, an operator sees a substantially continuous illumination and the device is not illuminated at all while it is under test. Further illumination enhancement is provided by a source of pulses which drives the illumination source during extended periods when no tests are actually being performed on the device.

BRIEF DESCRIPTION OF THE DRAWINGS

Other objects and features of the present invention will be more readily understood from the following detailed description of specific embodiments thereof when read in conjunction with the appended drawings in which.

DETAILED DESCRIPTION

Figure 1:
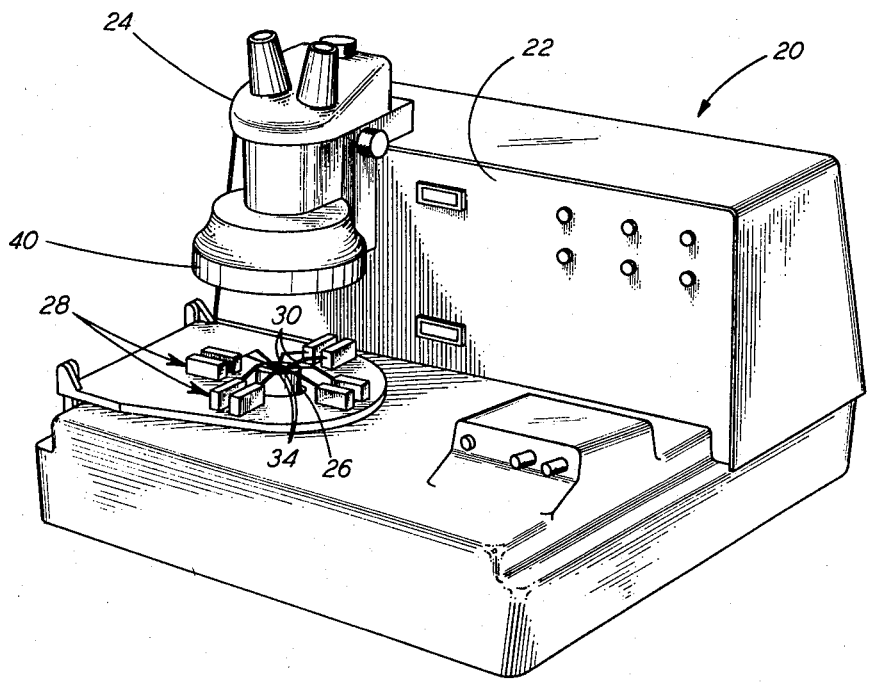
FIG. 1 is a perspective view of a probing machine on which the inventive illumination scheme finds utility.
Figure 2:
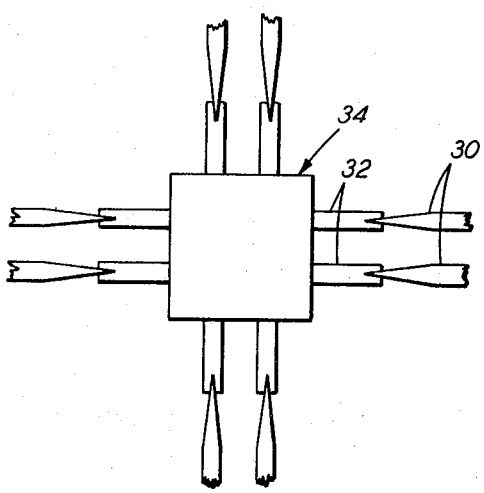
FIG. 2 is an illustration of a beam-lead integrated circuit chip with a plurality of probe tips in contact with the beam leads.

A wafer prober 20 such as that which is illustrated in FIG. 1 is readily available as a piece of conventional semiconductor production apparatus. One example of such a prober is available from Electroglas Incorporated of Menlo Park, California, marketed under product designation Model No. 900 Automatic Wafer Prober. Such a prober typically includes a control panel 22, a microscope 24, a wafer support 26 and various probe heads, designated generally by the numeral 28. Each of the probe heads includes a probe tip 30. As shown in FIG. 2, each of the tips 30 engages one lead 32 of an integrated circuit chip, designated generally by the numeral 34. Each of the tips 30 is connected electrically to a test set 36 illustrated schematically in FIG. 3.

Typical operation of the prober 20 involves placement of the tips 30 on the leads 32 of one of the chips 34. The test set 36 beings a series of tests on the chip 34 under control of a computer program. A number of tests are performed while the tips are engaged with the leads, perhaps as many as 20 to 30 tests. Each of the tests is of relatively short duration, in the order to 10 to 20 milliseconds. The time between tests is in the order of 2 to 4 milliseconds. After a complete series of tests are performed on a particular one of the chips 34, the wafer support 26 is lowered so that the tips 30 are disengaged from the leads 32. The wafer support 26 is then indexed a predetermined distance to bring a successive one of the chips 34 into position below the tips 30. The support 26 is then raised to engage the tips 30 with the leads 32 of the newly positioned chips 34. Another series of tests is performed by the test set 36.

If all of the chips 34 are placed on the wafer support 26 within an infinitely precise array and perfectly aligned with the axes on which the wafer support is indexed, the prober 20 could operate without any further adjustment, that is, a completely automatic operation. Such accuracy of alignment and spacing are simply not practicable and, as a result, it is necessary for an operator to periodically view the operation of the prober 20 through the microscope 24 in order to insure that the leads 32 are being contacted properly by the tips 30. Such viewing by the operator requires the provision of light from a light source 40.

Figure 3:
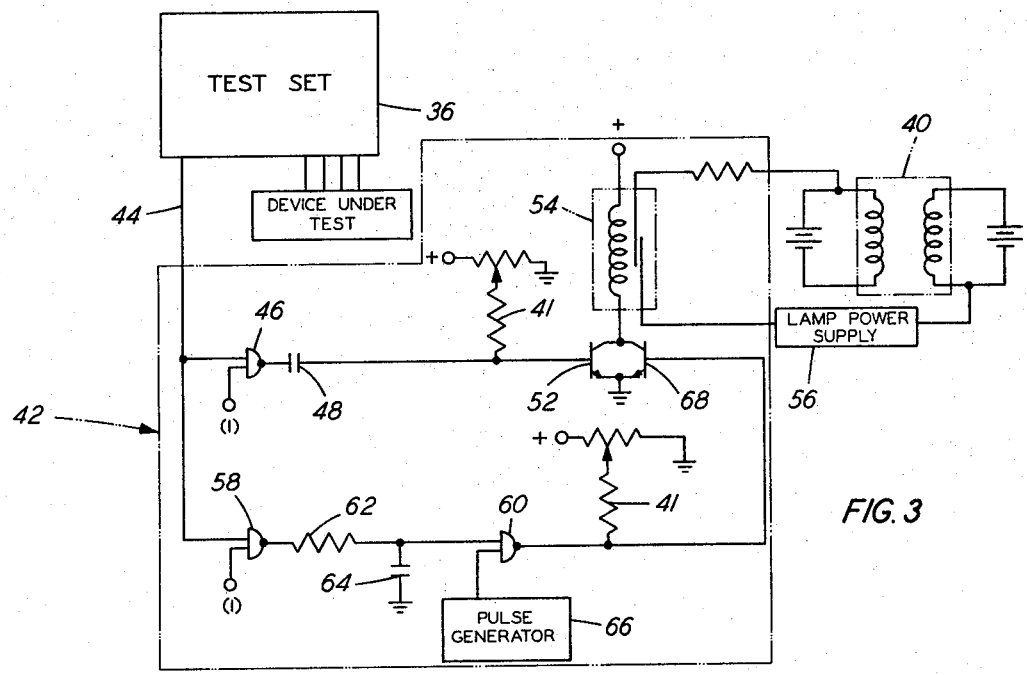
FIG. 3 is a schematic diagram of a circuit useful for driving a pulsable illumination source with the inventive synchronized mode of operation.
Figure 4:
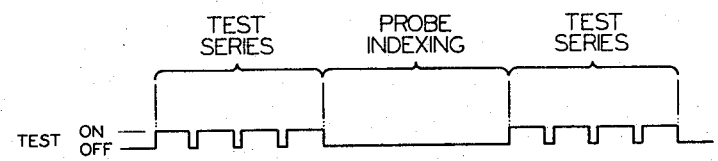
FIG. 4 is a timing diagram illustrating the operation of a test set.

The source 40 is uniquely controlled in accordance with an inventive method of synchronization. The source 40 must be of a type which can operate in a pulsable mode. A typical fluorescent lamp is one example of a suitable type. A source pulsing unit, designated generally by the numeral 42, is shown in FIG. 3. The pulsing unit 42 is synchronized with the test set 36 by connecting the unit to an unused output terminal 44 of the test set 36. Terminal 44 is provided with pulses at the same frequency that the tips 30 are pulsed. FIG. 4 shows a typical train of pulses emanating from the test set at terminal 44.

Figure 5:
FIG. 5 is a timing diagram illustrating the output of an inverting gate as related to the diagram of FIG. 4.
Figure 8:
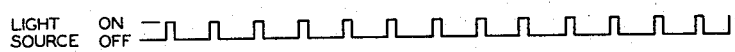
FIG. 8 is a timing diagram illustrating the operation of a lamp energized by the inventive synchronization system.

A NAND gate 46 is provided with a constant one level input at one terminal thereof. The other input terminal receives the series of pulses from the test set 36. The output of gate 46 is shown in FIG. 5 as a simple inversion of the train of pulses emanating from the test set 36. An isolating capacitor 48 and a conventional source of bias voltage 41 are interposed between the gate 46 and the base of a transistor 52. The transistor 52 is connected to control the current through a conventional reed switch 54. The reed switch 54, in turn, is arranged to control the output of a conventional power supply 56. FIG. 8 shows the light source voltage and it can be seen that the source 40 is energized to pulse synchronously with the output of the gate 46. Thus, when a test is being performed on the device 34, the source 40 is turned off. Between tests, the source 40 is turned on.

Figure 6:
FIG. 6 is a timing diagram illustrating the input of a gate connected to a pulsing source as related to the timing of FIG. 4.

A second NAND gate 58 is provided with a constant one level source at one of its input terminals and the other terminal is connected to receive the pulses emanating from the test set 36. The output of gate 58 is also illustrated in FIG. 5. The output of the gate 58 is connected to a third NAND gate 60 but interspersed between gates 58 and 60 are a resistor 62 and a capacitor 64 which provide a substantial draining of a pulsing output signal from gate 58 to ground. The effect of the grounding is shown in FIG. 6.

Figure 7:
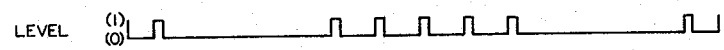
FIG. 7 is a timing diagram of the output of the gate of FIG. 6.

Thus, whenever the test set 36 is sending out pulses, gate 60 will be receiving a substantially zero input at one of its input terminals. However, when the test set 36 stops sending pulses, for example, during the indexing of the wafer support 26 or during some adjustment by the operator, the gate 60 will see a constant one level signal at said input terminal. A conventional pulse generator 66 is connected to the other input terminal of gate 60 and whenever the test set 36 stands idle, a pulsing output signal from gate 60 develops. The output of gate 60 is shown in FIG. 7. The pulsing output signal is, of course, at the frequency established by the pulse generator 66. The pulse generator frequency can be made to substantially match the frequency of the pulses emanating from the test set 36. Pulses from the gate 60 operate on a transistor 68 and, as with transistor 52, the result is a pulsing operation of the light source 40.

The unit 42 thus is capable of driving the light source 40 at a substantially constant rate, see FIG. 8. An operator who is viewing the activity of the prober 20 through the microscope 24 does not realize that any pulsing of the source 40 is occuring. The operator is provided with a substantially constant source of illumination irrespective of whether or not tests are being conducted on the chips 34. However, the chips 34 are provided with a desirable absence of illumination whenever they are under test. This is so because the effects of light on semiconductor material disappear after a few microseconds.

Although certain embodiments of the invention have been shown in the drawings and described in the specification, it is to be understood that the invention is not limited thereto, is capable of modification and can be arranged without departing from the spirit and scope of the invention.

What is claimed is:

1. In a method of testing light sensitive semiconductor devices with a rapid series of tests, each test having a brief duration, wherein an operator aligns a probing mechanism to illuminated devices by viewing the devices through a magnifying lens system, the improvement which comprises:

synchronizing a pulsable light source with the rapid test series so that during each test the source is turned off and between tests the source is turned on whereby the tests results are not adversely affected by the presence of light but an operator is provided with an apparent continuous illumination of the semiconductor devices from the source.

2. In a method of testing a plurality of semiconductor devices, wherein a probe moves from device to device, wherein during engagement of the probe with a device a series of tests is performed, each test having a duration of 10-20 milliseconds and wherein an operator maintains appropriate alignment between the probe and desired portions of the semiconductor devices by viewing the devices and the probe through a magnifying lens system, the improvement which comprises:

synchronizing a pulsable light source with the test series to deenergize the source during each test so as to not adversely affect the test results by the presence of light and to energize the source between each test so that an operator sees an apparent continuous illumination from the source of the devices during the series of tests.

3. A method of testing semiconductor devices, which comprises the steps of:
aligning the devices individually with testing probes;
engaging the testing probes with the aligned device;
performing a series of tests in rapid succession while said probes are so engaged; and
controlling a light source to illuminate the device and the engaged probes during intervals between tests and to not illuminate the device while a test is being performed.

4. The method of testing of claim 3 wherein the series of tests is performed with a frequency at least as rapid as 25 tests per second.

5. The method of testing of claim 3 wherein the series of tests is performed with a frequency of from 50 to 100 tests per second.

6. The method of testing of claim 3, wherein a plurality of devices are sequentially tested, which comprises the further steps of:
disengaging the probes from a first device;
moving the probes relative to said devices to be tested to align the probes with a second device; and
controlling the light source during said movement to cause the light source to illuminate the probes and any underlying devices.

7. Apparatus for testing a plurality of semiconductor devices wherein a probing mechanism moves from device to device, wherein, during engagement of the probe with a device, a series of test cycles are performed, each test cycle having a duration of 10–20 milliseconds, and wherein an operator maintains appropriate alignment between the probe and desired portions of the semiconductor device by viewing through a magnifying lens system, which comprises:

a pulsable illumination source synchronizable with a test cycle so that while the device is undergoing tests the source is off and while the device is not being tested the source is on whereby the test results are not adversely distorted by the presence of light but an operator sees a continuous illumination of the semiconductor device, and a separate pulsing means to drive the light source when no tests are being performed so that the light appears continuous when the probe is being moved between devices.

8. The apparatus of claim 7 further comprising a pulse emitting test set and wherein the separate pulsing means operates continuously but is rendered ineffective by pulses from the test set when testing occurs.

9. Apparatus for synchronizing a pulsable lamp with a test set, which comprises:
a source of a train of pulses on said test set;
means for inverting the train of pulses;
means responsive to each pulse emanating from said inverting means for energizing a light source;
continuously operating pulse-producing means for energizing said light source; and
means responsive to the absence of a train of pulses from the test set for rendering effective said pulse-producing means to energize said lamp.

10. The apparatus of claim 9 wherein the means for rendering effective the pulse-producing means comprises:
a NAND gate, a first input terminal of which is connected to the pulse-producing means and a second input terminal of which is resistor-capacitor coupled to the source of the train of pulses on the test set, the resistor-capacitor coupling preventing repeating pulses from the test set from reaching said second input terminal, said NAND gate having its output terminal connected to control an energizing circuit, whereby when repeating pulses from the test set stop, pulses begin emanating from said gate and the lamp is energized under the control of the pulse-producing means.

* * * * *